Patented Nov. 7, 1933

1,934,171

UNITED STATES PATENT OFFICE 1,934,171

METHOD OF PREPARING ZINC PHTHALATE

Lloyd C. Daniels, Crafton, Pa., assignor to The Selden Company, Pittsburgh, Pa., a corporation of Delaware No Drawing. Application August 18, 1930
Serial No. 476,243

8 Claims. (Cl. 260—11)

This invention relates to the production of zinc phthalate which is soluble in organic solvents.

In the past zinc phthalate has been prepared by reacting on zinc oxide or zinc carbonate with phthalic acid. The product is not soluble in organic solvents and cannot be used as a lacquer base and plasticizer for various plastic compositions and lacquers. In fact the trade has been obliged to use ester salts such as zinc ethyl phthalate in order to obtain the desired solubility. These products are very much more expensive than zinc phthalate but up to the present time it has not been possible to produce a zinc phthalate which is soluble in organic solvents.

According to the present invention a zinc phthalate is produced which is soluble in organic solvents by bringing about reaction between phthalic acid and a zinc salt of an organic acid weaker and preferably more volatile than phthalic acid and particularly by reacting with zinc oxide or carbonate in the presence of a small amount of acid, particularly organic acid, as a carrier, the latter process being the preferred one.

It is not known just why the zinc phthalates produced by the present invention are soluble in organic solvents, whereas the zinc phthalates hitherto produced were not soluble. I am of the opinion that the reason for the solubility lies in the fact that the zinc phthalates produced by the present invention are probably completely neutral, whereas in the past it was not possible to obtain them completely neutral and they were either slightly basic or slightly acid. However, it is not as yet proven that this is the reason for the remarkable properties of the zinc phthalates of the present invention, and the invention is in no sense limited to the theory above set forth, which is merely given as the best explanation available. Any suitable acid may be used as a carrier provided it is weaker than phthalic acid. I have found that acetic acid is very suitable, and as it is one of the cheapest organic acids its use is commercially attractive. Other volatile organic acids such as formic acid, propionic acid, and the like may be used if desired.

The invention will be described in connection with the following specific example.

Example 1 mol. of zinc oxide or carbonate is suspended in water and an amount of acetic acid is added equivalent to from 2–10% of the zinc oxide. Phthalic acid, or, if desired, phthalic anhydride, is gradually added with vigorous stirring. It reacts with the zinc acetate in solution rapidly, and zinc phthalate is continuously precipitated out. The amount of phthalic anhydride or acid added should preferably also be 1 mol. After all of the phthalic acid has been added, the precipitated zinc phthalate is filtered and washed free from acetic acid with successive portions of cold or warm water. Thereupon the product is dried and can be dissolved in hot organic solvents such as alcohols, acetones and similar ketones, esters such as ethyl, butyl or amyl acetates or mixtures of the common lacquer solvents. The reaction takes place at room temperatures but somewhat more rapid results may be obtained at slightly higher temperatures. In general, however, the temperature should not exceed about 80° C. for best results.

What is claimed as new is:

1. A method of preparing zinc phthalate which comprises suspending a compound selected from the group consisting of zinc oxide and zinc carbonate in water, adding a small amount of an acid weaker than phthalic acid and then adding phthalic acid with agitation until the zinc has been precipitated as zinc phthalate.

2. A method according to claim 1, in which the acid is a volatile organic acid.

3. A method according to claim 1, in which the acid is acetic acid.

4. A method according to claim 1, in which the acid is from 2 to 10% of the zinc present.

5. A method according to claim 1, in which acetic acid is used as the acid in an amount from 2 to 10%.

6. A method according to claim 1, in which the amount of phthalic acid caused to react with the zinc compound is stoichiometrically equivalent thereto.

7. A method according to claim 1, in which the amount of phthalic acid caused to react with the zinc compound is stoichiometrically equivalent thereto and in which the acid used is a volatile organic acid.

8. A method according to claim 1, in which the amount of phthalic acid caused to react with the zinc compound is stoichiometrically equivalent thereto and in which the acid used is an organic acid in an amount from 2 to 10%.

LLOYD C. DANIELS.